US012809955B2

(12) United States Patent
Huang et al.

(10) Patent No.: US 12,809,955 B2
(45) Date of Patent: Nov. 24, 2026

(54) SYSTEMS AND METHODS FOR COMPROMISED CARD DETECTION DURING SERVICE REQUEST PROCESSING BY A DISTRIBUTED SERVICE SYSTEM

(71) Applicant: STRIPE, LLC, South San Francisco, CA (US)

(72) Inventors: Qiming Huang, White Plains, NY (US); Chiranth Manjunath Hegde, Seattle, WA (US); Swara Mehta, Singapore (SG); Inayat Khosla, Toronto (CA)

(73) Assignee: Stripe, LLC, South San Francisco, CA (US)

( * ) Notice: Subject to any disclaimer, the term of this patent is extended or adjusted under 35 U.S.C. 154(b) by 59 days.

(21) Appl. No.: 18/980,777

(22) Filed: Dec. 13, 2024

(65) Prior Publication Data

US 2026/0170105 A1 Jun. 18, 2026

(51) Int. Cl.
*G06F 21/31* (2013.01)

(52) U.S. Cl.
CPC .................................... *G06F 21/31* (2013.01)

(58) Field of Classification Search
CPC ................................. G06F 21/31; G06F 21/34
See application file for complete search history.

(56) References Cited

U.S. PATENT DOCUMENTS 10,230,729 B2 * 3/2019 Du .......................... H04L 63/10
2020/0211022 A1 * 7/2020 Allbright ............ H04L 63/1408
2023/0101117 A1 * 3/2023 Allbright ................ H04L 63/10 705/39
2023/0118240 A1 * 4/2023 Wong ................. G06Q 20/4015 705/44
2024/0119346 A1 * 4/2024 Chang ................ G06Q 20/4016
2024/0232889 A1 * 7/2024 Skalski .................. G06N 3/084
2024/0264977 A1 * 8/2024 Cooper ................... G06F 16/14
2024/0281473 A1 * 8/2024 Cooper ................. G06F 16/908
2024/0311834 A1 * 9/2024 Perez ................... G06Q 20/383
2025/0363484 A1 * 11/2025 Garg ................ G06Q 20/38215
2026/0004299 A1 * 1/2026 Barshishat ......... G06Q 20/4016

* cited by examiner

*Primary Examiner* — Kostas J Katsikis

(74) *Attorney, Agent, or Firm* — FINNEGAN, HENDERSON, FARABOW, GARRETT & DUNNER, LLP

(57) ABSTRACT

A method and apparatus for detecting compromised cards during service requests transmitted to a distributed services system are described. The method includes receiving a new service request associated with a card that authorizes the service request during a second time period that is after a first time period. The new service request is processed within a processing path executed by the server computer system. During processing of the new service request, an output generated by a machine learning model outside of the processing path and prior to the second time period is accessed, where the output indicates whether the card is compromised during the first time period. The output is applied to the new service within the processing path to indicate whether the card is compromised and initiating one or more remedial actions, in response to inferring that the card is compromised.

20 Claims, 9 Drawing Sheets

SYSTEMS AND METHODS FOR COMPROMISED CARD DETECTION DURING SERVICE REQUEST PROCESSING BY A DISTRIBUTED SERVICE SYSTEM

BACKGROUND

Server computer systems provide remote services to client systems over a network, such as the internet, a local network, a telecommunications network, or a combination of various network types that enable communication between remotely located systems. The services can include, for example, fraud detection, performing an action requested by a first computing system with another remotely located computing system, storing and/or transferring data, as well as a number of other services that may be remotely provided by the server computer systems. Such server computer systems typically offer multiple services for the clients of the server computer system, which are distributed among processing resources of the server computer system.

Systems that use the services of the server computer systems are referred to as client systems. Furthermore, client systems may provide information or data that is used to authorize the performance of a service. For example, client systems may have cards with authentication information (e.g., a card identifier, a user identifier, a key, and other unique authentication information) that enables the client system to authorize the service once the authentication information is verified. Such authorization may be made by the server computer system or by a third party system that generated the card and authentication information, and verified before a service is performed.

In some scenarios, however, a card used to authorize services of the server computer system may become compromised. That is, a nefarious actor may obtain the card's authentication information, or the card itself, and then seek to use the card to perform one or more of the services offered by the server computer system without the consent or knowledge of the client system. The nefarious actor will typically attempt to use the card before the true client system owner of the card discovers that the nefarious actor has control of the card, and before a party that generates the card, identifiers, and other information becomes aware that the nefarious actor has control of the card. During this period in which a card and the authentication information associated with the card are still valid, and which the nefarious actor has control of the card authentication information, the card is considered to be compromised because the nefarious action can attempt to use the card information to perform fraudulent service requests.

A technical challenge exists in detecting compromised cards where the service requests are issued, performed, and completed remotely between remote systems. Furthermore, the service requests may seem legitimate because the card and authentication information is still valid at the time the nefarious actor seeks to use the card to authorize a service request. Additionally, the server computer system typically operates at a large scale, such as processing millions or more service requests per minute, hour, day, etc., and thus identifying and taking remedial actions when cards are compromised is exacerbated by the quantity of service requests, cards, and communications involved.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

Figure 1:
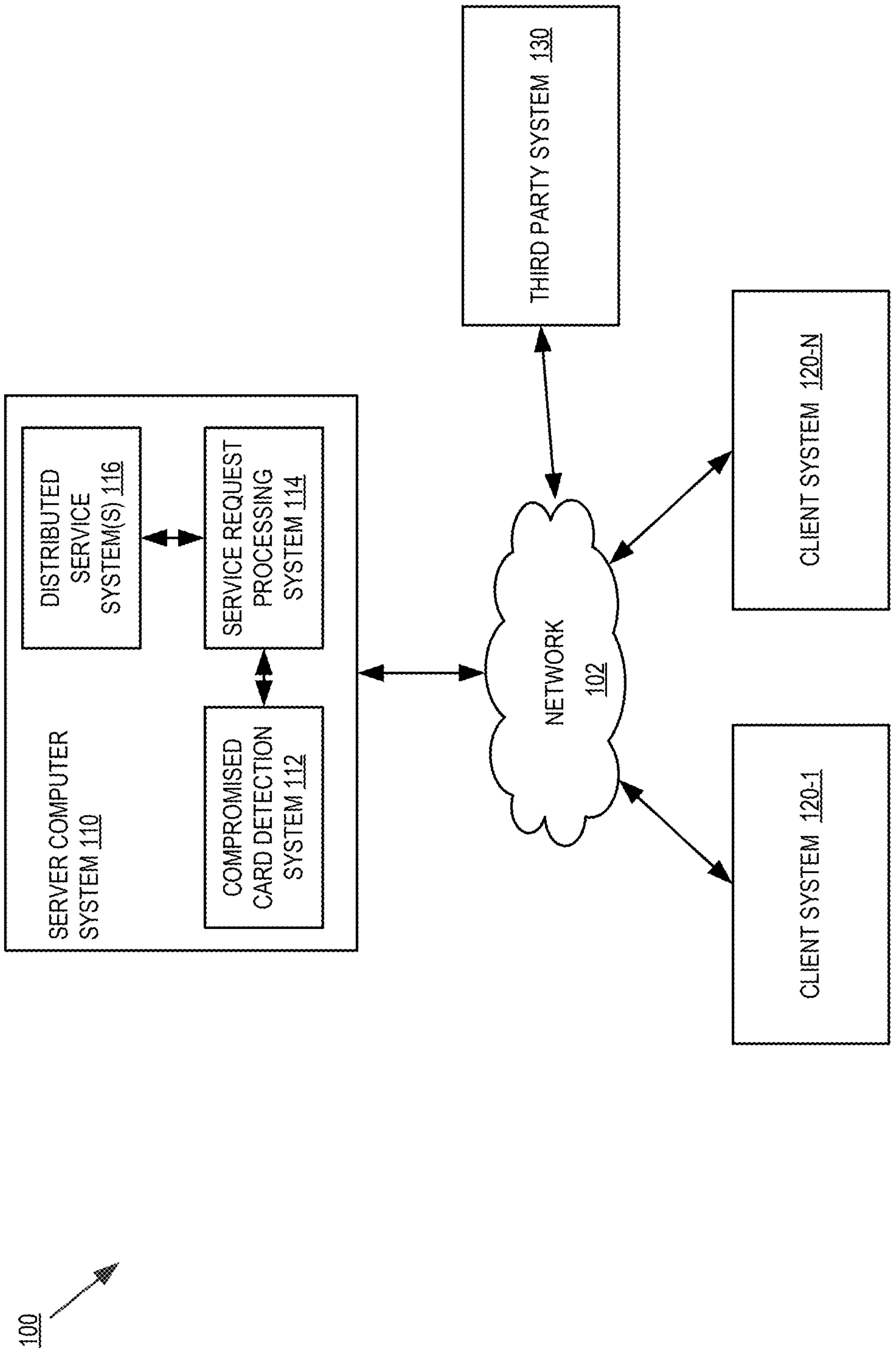
FIG. 1 is a block diagram of an exemplary system architecture for a server computer system that detects compromised cards when providing distributed services to client systems.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "generating", "storing", "receiving", "inferring", "continuing", "initiating", "accessing", "training", "updating", "applying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 is a block diagram of an exemplary system architecture 100 for a server computer system 110 that detects compromised cards when providing distributed services to client systems.

In one embodiment, the system 100 includes server computer system 110, a plurality of client systems (e.g., client system 120-1 through client system 120-N, sometimes referred to herein as client systems 120), and third party system 130. In one embodiment, one or more systems (e.g., systems 120 and/or 130) may be mobile computing devices, such as a smartphone, tablet computer, smartwatch, etc., as well computer systems, such as a desktop computer system, laptop computer system, server computer systems, etc. The server computer system 110, client systems 120, and third party system 130 may also be one or more computing devices, such as one or more server computer systems, desktop computer systems, etc. Furthermore, there may be any number of client systems utilizing the distributed service system(s) 116 of the server computer system 110, and any number of third party systems that are responsible for generating cards with authentication information, consistent with the discussion herein.

Furthermore, it should be appreciated that the embodiments discussed herein may be utilized by a plurality of different types of server computer systems. For example, such server computer systems can provide data storage services, multimedia portal services, gaming services, real time image and video systems, as well as other types of systems in which cards and associated authorization information is used to authorize a service requested to be performed at the server computer system 110.

The server computer system 110, client systems 120, and third party system 130 may be coupled to a network 102 and communicate with one another using any of the standard protocols for the exchange of information, including secure communication protocols. In one embodiment, one or more of the server computer system 110, client systems 120, and third party system 130 may run on one Local Area Network (LAN) and may be incorporated into the same physical or logical system, or different physical or logical systems. Alternatively, the server computer system 110, client systems 120, and third party system 130 may reside on different LANs, wide area networks, cellular telephone networks, etc. that may be coupled together via the Internet but separated by firewalls, routers, and/or other network devices. In one embodiment, server computer system 110 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In embodiments discussed herein, server computer system 110 provides services to client systems 120 via network 102. The services are provided by a set of distributed service systems 116, which are computationally distributed and/or physically distributed between different hardware systems of the server computer system 110. The services can include, for example, onboarding services to collect information from a new client system, data distribution services for storing, moving, consolidating, etc. client system data, facilitating interactions between a client system (e.g., client system 120) and a user of the client system, planning systems that enable server computer system 110 to provide planning of resources used by the client systems 120, etc., as well as a combination of such services that can be provided remotely over network 102.

In some embodiments, one or more of the services provided by distributed service systems(s) 116 requires authorization of a requesting client system 120 before the requested service is performed. Such authorization can include a client system supplying authorization information associated with a card along with a service request to service request processing system 114. The card authorization information can include a name of a user of the client system, an identification number of the card, a personal identification number (PIN) associated with the card, one or more keys encoded in the card, as well as other authorization information.

As discussed herein, card authorization information, and thus a card itself, may be stolen and used for nefarious purposes. Furthermore, the true owner of the card, or a third party system 130 that issues and/or validates the authorization information prior to performance of a requested service, may not be aware that the card is compromised at the time the nefarious actor seeks to use the card. In other words, the nefarious actor having the card authorization information seeks to have the server computer system 110 perform one or more services by authorizing the services using the stolen card information, which may be assessed against an account of the true card owner. However, the true owner of the card does not authorize the service request, and thus use of a compromised card represents fraud perpetrated by the nefarious actor on the server computer system 110, the client system 120, the third party system 130, and the true owner of the compromised card. Furthermore, the compromised nature of the card may not be discovered for a time period, which enables the nefarious actor to fraudulently engage the services of the server computer system 110.

To exacerbate the problem, the card information may be transmitted to the service request processing system 114 in seemingly legitimate service request messages from a remote system, such as the client system 120. Therefore, a technical challenge is created in how to accurately and remotely detect compromised cards. The problem is further exacerbated by the scale at which service request processing system 114 receives, authorizes, and uses distributed service system(s) 116 to process service requests. That is, it becomes increasingly difficult to detect compromised card use when service request processing system 114 receives millions of service requests each minute, hour, day, etc.

To address these technical challenges, as discussed in greater detail herein, the card authorization information received with a service request is provided by the service request processing system 114 to the compromised card detection system 112. The compromised card detection system 112 executes a machine learning (ML) model that uses the received card authorization information and service request information (e.g., user name, user contact information, card number, PIN number, given address of a user originating the service request, IP address of a device originating the service request, as well as other information) to predict whether a card is compromised within a service request processing path. As discussed herein, a card history maintained at the server computer system of past service requests associated with the card, user, client system, etc. forms a rich corpus of information from which to perform compromised card detection, as discussed herein.

In some embodiments, the ML model executed by the compromised card detection system 112 may be a neural network based ML model (e.g., a deep neural network), a tree based machine learning model, a support vector machine learning model, or a combination of models, that is periodically trained based on a number of different features derived from the corpus of service request information, and that are labeled as being associated with a compromised card or not being associated with a compromised card. Then, in some embodiments, the compromised card detection system 112 can use scores generated in an offline process by the ML model for one or more of a past transactions to make an online inference as to whether or not the card is compromised, and/or use scores by deriving features for a newly received transaction in an online process, and using the derived features as input into the ML model to generate the scores during the service request. These embodiments of scoring and/or inferring whether a service request is associated with a compromised card, the training of the ML model that predicts whether a card is compromised, and how training data is generated and labels applied to the training data, are each discussed in greater detail below.

The compromised card score(s) generated by the ML model of the compromised card detection system 112 are then analyzed according to one or more rules. In some embodiments, the one or more rules use at least the scores to determine when, for example, the scores satisfy compromised card thresholds associated with the rules. In some embodiments, one or more other machine learning model scores (e.g., fraud detection machine learning models, card cashing machine learning models, card testing machine learning models, and other machine learning models) can be combined with the scoring generated by the compromised card detection system 112 scores to create a multi-dimensional score. Such multi-dimensional scores combining different fraud detection types may further increase the accuracy with which compromised cards are detected by broadening the types of signals and scores used to generate a decision as to whether a compromised card is being used in a service request.

When one or more rules are satisfied defining conditions to indicate that the card used in the service request is predicted to be a compromised card, the rules that are satisfied may also specify one or more actions that the service request processing system 114 can take with respect to the subject service request. In some examples, the actions include blocking or rejecting the service request, blacklisting the card used in the service request to prevent future use of the compromised card, revising one or more ML model thresholds when a card is predicted to be compromised, limiting a rate of service requests that can be received using the card, from a user of the card, from a client system that generated the service request, etc., as well as triggering and performing other remedial actions against the compromised card, user, or client system 120.

Beneficially, and as discussed in greater detail herein, the compromised card detection is performed in a service request processing path so that compromised cards can be detected, and remedial actions taken, before a requested service is performed based on the supplied compromised card information. Therefore, in some embodiments, the ML model based analysis utilizes techniques that are computationally efficient, have low latency, and can be performed at scale. For example, in some embodiments, features used by the ML model are cumulative and reflect a current pattern of card usage. Thus, analysis of a prior set of service requests that determine whether or not a card is compromised, will generate an accurate prediction or inference as to whether a current service request using the card should be classified as using a compromised card. In other words, the computationally intensive operations, such as ML training, ML feature computation, and application of the computed features to a set of service requests, are performed prior to receipt of a current service request. Then, computationally efficient operations with low latency, such as accessing a prior compromised card detection score, and inferring that the current service request using the card should have the same score as the prior score, can be more efficiently performed within the service request processing path. Further, the rules can be applied to determine whether and which remedial actions to take within the narrow time window of the service request processing path, which improves the functioning of the server computer system 110 and the service request processing system 114.

Figure 2:
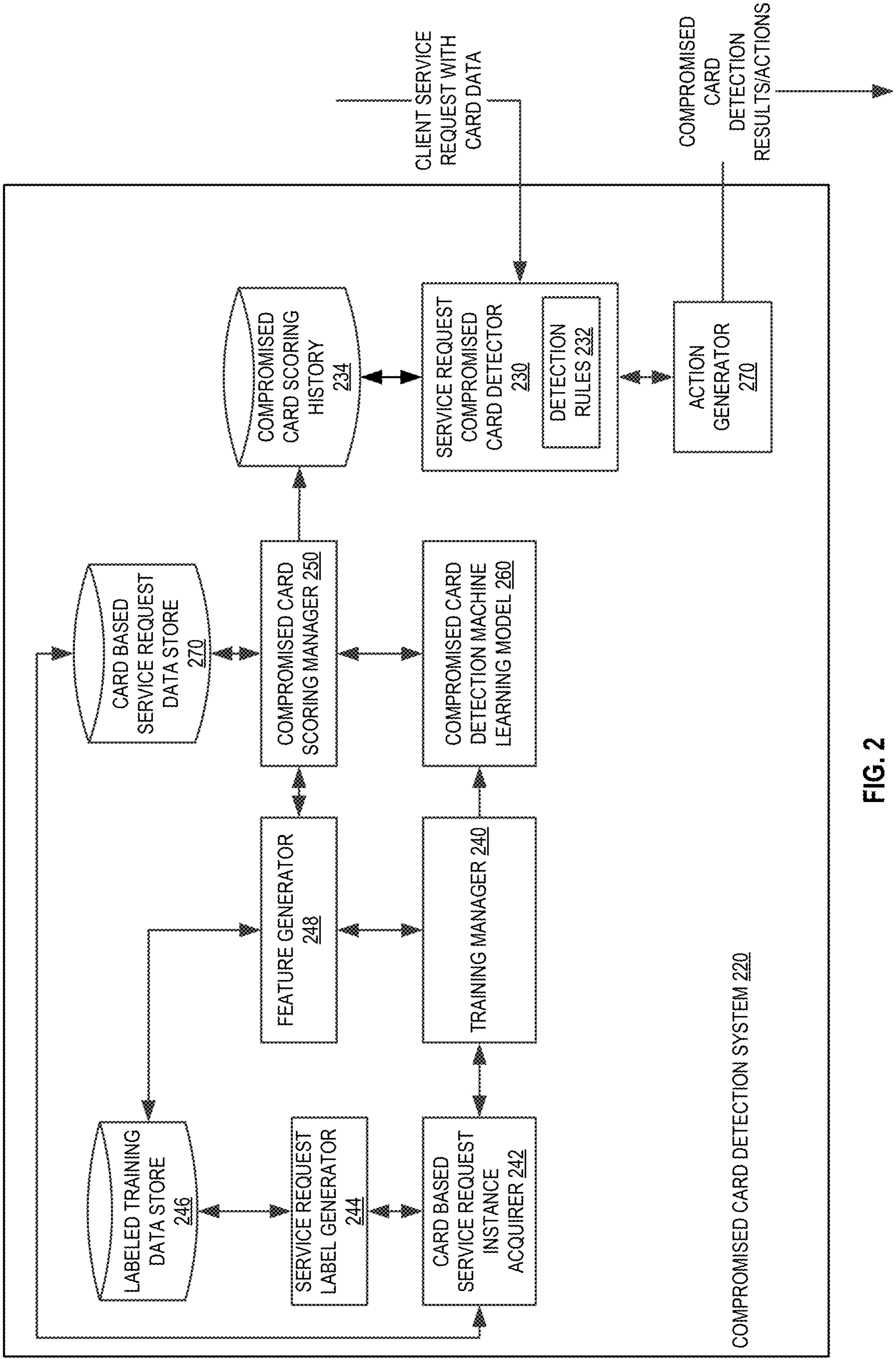
FIG. 2 is a block diagram of one embodiment of a compromised card detection system used by a server computer system.

FIG. 2 is a block diagram of one embodiment of a compromised card detection system used by a server computer system. Compromised card detection system 220 provides additional details for the compromised card detection system 112 discussed above in FIG. 1. Furthermore, compromised card detection system 220 is comprised in a server computer system, such as server computer system 110. The server computer system may be a single computer server system, a plurality of interconnected server systems, and/or remotely located server computer systems communicatively coupled via a network (e.g., network 102). In some embodiments, compromised card detection system 220 may therefore be an instance of a compromised card detection system, with instances distributed and executed at different server computer systems responsive to load, geographic limitations, compute power available at specific server systems, etc.

In some embodiments, compromised card detection system 220 is a machine learning (ML) model based system that provides accurate and efficient techniques for performing compromised card detection within a service request processing path. Compromised card detection system 220 therefore includes a compromised card ML model 260, a training manager 240, a feature generator 248, a card based service request instance acquirer 242, a service request label generator 244, and a labeled training data store 246.

In some embodiments, ML model 260 is responsible for generating compromised card scores that predict whether a service request received by a server computer system (server 110) is associated with a compromised card. The ML model 260 may be a neural network based ML model (e.g., a deep neural network), a support vector machine based ML model, a tree based ML model, or a combination of different types of ML models.

In order to generate the predictions by ML model 260, training manager 240 is responsible for managing the periodic training of ML model 260 using features computed by feature generator 248 based on a corpus of labeled training data in training data store 246. Periodic training and retraining of the ML model 260 may be performed daily, weekly, monthly or on another periodic basis.

In some embodiments, the training manager 240 uses card based service request instance acquirer 242 to access a window of past service requests. The window, in some embodiments, corresponds to a set of service requests over a time period, which may be the same or different time period in which the periodic training/retraining of the ML model 260 occurs. For example, in some embodiments, the accessed window of past processed service requests may be greater than the period in which ML training occurs (e.g., service requests from a prior 6 months are acquired whereas training/retraining may occur on a daily, weekly, or monthly basis). In embodiments, the acquired service request instances correspond with a plurality of service requests, and each includes data associated with the service request. For example, the data can include card information used to authorize a service request (e.g., card identifier, user identifier, PIN number, keys encoded by the card, a BIN number, etc.), user information (e.g., a user name, email address, address, phone number, etc. of the user making the service request request), user system information (e.g., a client system's and/or user of a client system's IP address), a service request type and parameters (e.g., an amount requested in a service request, a specific service or services requested, a time of the request, etc.), one or more fraud detection or other ML scores generated for the transaction (e.g., fraud detection, card cashing detection, card testing detection, or other ML model scoring that is performed for a service request, but not by the ML model 260), responses to a service request (e.g., whether an issuer of the card provided one or more feedback codes, such as decline codes, for a service request that declines the service request), as well as other information related to a service request.

For each acquired service request instance, service request label generator 244 applies a label that indicates whether the card associated with the service request is compromised or not compromised. In some embodiments, service request label generator 244 labels the service request as being associated with a compromised card if any of the other model scores discussed above (e.g., a card cashing ML model score, a card testing ML model score, a fraud ML model score, or other score generated for a service request) satisfies fraud for a service request. In some embodiments, a label that the service request is associated with a compromised card is also applied when a service request is associated with an appropriate card issuer feedback code (e.g., a decline code). In some embodiments, known card information, such as collections of card information on the dark web or other forums for trafficking in stolen card information, may be used to determine when a card appears in such a collection at the time a service request was processed. Furthermore, labels may also be generated indicating a service request as being associated with a compromised card based on a heuristic analysis, such as a function, threshold, or combination of one or more of the above discussed label generation sources. Once a service request is joined with a label, it is stored in labeled training data store 246. Furthermore, once stored in labeled training data store 246, the corresponding service request, data, and label generation need not be reperformed, which avoids duplicative processing efforts and reduces computational loads on new label training data generation. Furthermore, in some embodiments, once a labeled service request instance is outside of the training window, it can be removed from data store 246 to free up storage and control the memory footprint of the data store 246.

Training manager 240 further causes feature generator 248 to access the labeled training data store 246 for generation of ML features (or input signals) associated with a service request instance. In embodiments, the features generated by feature generator include character based features (e.g., user name, card name, email address, etc.), categorical features (e.g., an IP address of a system generating the service request, an agent of user of a client system generating the service request, an identifier of a client system, a card BIN number, etc.), and numerical features (e.g., for a card, a count of service requests received over a 1 day period, 7 day period, 60 day period; a count of a card name used over a 1 day period, 7 day period, 60 day period; a count of an email address used over a 1 day period, 7 day period, 60 day period; a count of issuer decline codes received over a 90 day period; counts associated with a number of times fraud was detected over different time periods, counts associated with service request ID; as well as many other counts of card based and service based information over one or more periods of time). In some embodiments, the text and categorical features may be transformed, such as by use of an embedding transform or GRU transform that converts text information to a numerical value. In some embodiments, these computed features may also be stored and associated with the labeled service request instances in data store 246 to avoid future duplicative computing efforts. In some embodiments, for cumulative features, prior features of prior service requests can be used and updated for newly received features to make feature computation for a current service request more efficient.

Training manager 240 then uses the corpus of features generated for each service request instance, and their associated labels, to perform iterative training of the ML model 260. Once trained, the ML model 260 can generate compromised card detection scores based on the input features for newly received service request. The compromised card detection scores, in some embodiments, are numerical prediction values indicative of a likelihood that a card with the associated input feature set is compromised. Furthermore, the scores may be compared to a threshold value and/or combined with one or more other fraud detection scores to determine if a card is compromised for a given service request.

In embodiments, a number of the aforementioned features used by the ML model 260 are cumulative over a time period. That is, they represent a pattern of behavior for service requests and specific card information. Therefore, in some embodiments, compromised card scoring manager 250 periodically generates scores for prior service requests, which are saved in compromised card scoring history data store 234. The score generation period for score generation by scoring manager 250, in some embodiments, may be a different periodic interval than the window from which features are generated. In embodiments, the ML model 260 is trained as discussed above, and thus scoring manager 250 accesses a set of service requests from card based service request data store 270, causes feature generator 248 to generate features (as discussed above, or recalled from data store 246 when feature sets are stored during training) for each of the set of service requests, and feeds the service requests with associate feature sets to ML model 260. ML model 260 generates compromised card scores based on the input feature sets for each of the set of service requests, and scoring manager 250 stores the scores in compromised card scoring history 234.

In some embodiments, when a new client service request with card data is received by service request compromised card detector 230, the compromised card scoring history 234 is accessed based on the card information received with the new client service request. In some embodiments, service request compromised card detector 230 accesses a latest compromised card score generated by scoring manager 250 and ML model 260 and stored in data store 234. As indicated above, the scoring generated by ML model 260 is generated using a number of card specific features (that are unique to a specific received card, client system, user, etc.) as well as cumulative features (e.g., different count-based features over different time periods). Therefore, the latest score in card scoring history data store 234 for a card used in a new service request is a highly accurate estimate of a score that would be generated for the received new client service request if features were to be generated specifically for that new client service request. However, to minimize latency in generating compromised card detection results/actions, compromised card detector 230 infers that the current compromised card ML score is the latest pre-generated compromised card score. Thus, a highly efficient data access (e.g., one or more read operations) are performed to obtain a score of the current service request, rather than performing a larger number of data accesses, feature generation operations, label application operations, etc. that would be performed to generate a compromised card ML model score from scratch for the new service request. However, given the cumulative nature of the ML model 260's input signals, the latest and pre-generated compromised card score is sufficiently similar to, and in some instances nearly identical to, the score that would be generated from scratch during the processing of a service request. Thus, the computationally intensive operations of score generation can be avoided, in some embodiments, by performing them in an offline process. Then computationally efficient and low latency operations including applying an inference of a compromised card score from the offline process by compromised card detector 230 are made to reduce computational load and latency for detecting a compromised card during online processing of a new service request.

Compromised card detector 230, once the inference of a compromised card score is applied to the new client service request and the card information received with the new client service request, one or more detection rules 232 can be applied. In some embodiments, the detection rules 232 include comparing the compromised card score for the new client service request to a threshold, which if met, indicates that the service request is being performed using a compromised card. In some embodiments, the new client service request can be accompanied by information, such as one or more other ML model scores generated by other service request processing ML models (e.g., fraud detection ML model scoring, card testing ML model scoring, card cashing ML model scoring, etc.). One or more of the other ML models scores may be combined (e.g., summed, averaged, weighted averaging, or combined via another function) with an inferred compromised card score for the new client service request to generate a multidimensional compromised card score. That is, multiple fraud/compromised card scores are combined, and may be compared to one or more other threshold values, which can further improve the likelihood that a compromised card is detected for the service request because the multidimensional score may add more context to a potential compromised card.

In some embodiments, compromised card scoring manager 250 may generate the threshold values used by detection rules 232 through backtesting operations. That is, when generating compromised card scores for storage in 234, compromised card scoring manager can test and adjust the detection rule thresholds. In some embodiments, the thresholds are adjusted to ensure a certain percentage of compromised card based service requests are detected, while minimizing false positive detections. For example, back testing can be run, and re-run, until the thresholds satisfy a 90%, 95%, 99%, etc. compromised card detection rate on historical service request data.

Action generator 270 receives the outcomes of the detection rules 232 for the new client service request. When a compromised card is not detected as being used to authorize the new client service request, the service request can proceed (e.g., be processed by one or more distributed services systems) and no remedial actions are taken against the new client service request. However, when a compromised card is detected for authorizing the new client service request, action generator 270 generates commands that cause one or more of blocking the service request from proceeding, generating an electronic message to a user, client system, and/or card issuer that the card used for the new client service request is compromised, commanding a system that receives service requests (e.g., service request processing system 114) to limit a rate of received service requests from the card, user, or client system associated with the detected compromised card, or a combination thereof.

Figure 4A:
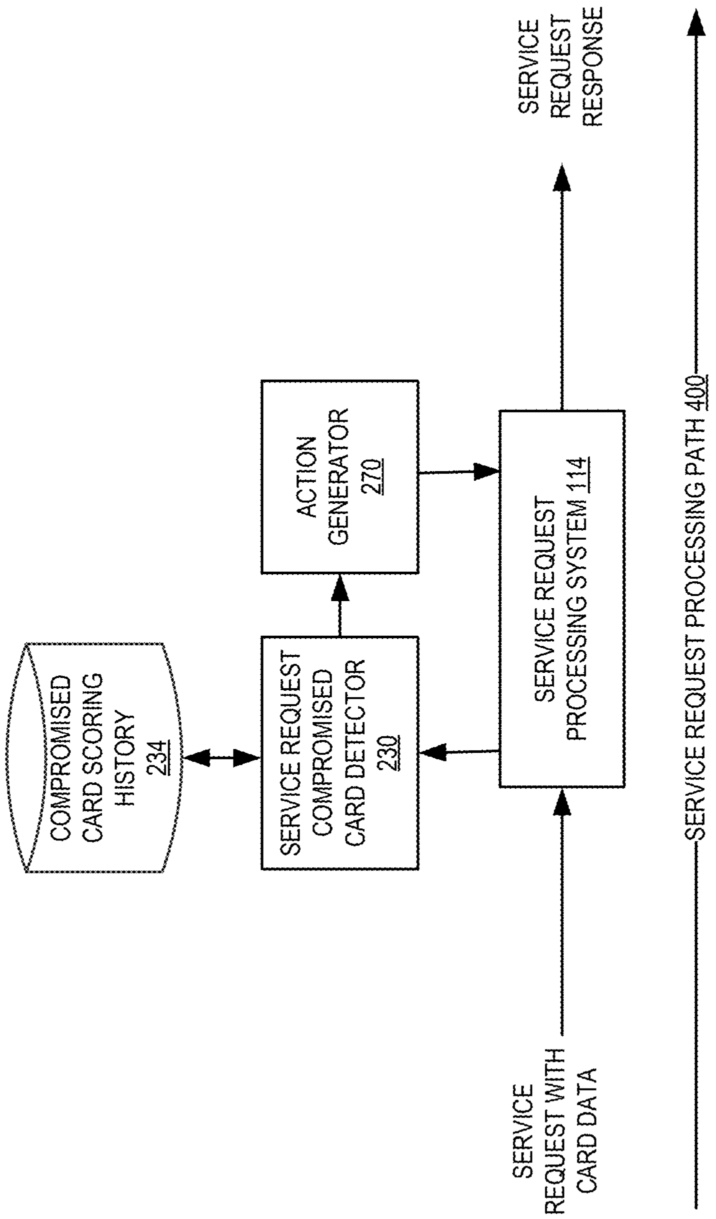
FIG. 4A is a block diagram of one embodiment of performing compromised card detection by a server computer system in a service request processing path.

FIG. 4A is a block diagram of one embodiment of performing compromised card detection by a server computer system in a service request processing path, and provides additional details to the elements and embodiment discussed above in FIG. 2. As discussed above, the training operations and the scoring performed by compromised card detection system 220 are performed in an offline or asynchronous process. That is, they are performed prior to the operations of the service request processing path 400. The service request processing path is the path in which a service request is received, processed by service request processing system 114, and then executed by one or more services. Thus, reducing computationally complexity and minimizing latency introduced into the service request processing path 400 is highly desirable to reduce any delay in the processing path, as well as to reduce computational load exerted on hardware systems by the processing path operations. Fraud detection, such as detecting compromised cards used for authorizing service requests is also highly desirable to prevent fraud from being perpetrated on true owners of a compromised card, the service request system 114, and a card issuer system. Thus, in some embodiments, the computationally and memory intensive operations of feature generation and ML analysis are moved outside of the service request processing path 400. Instead, computationally efficient data accesses and an inference is applied to a service request, and actions are generated to take remedial actions, as discussed above in FIG. 2, within the service request processing path 400 to minimize latency while at the same time providing highly accurate ML model based compromised card detection using less computational and memory resources.

Figure 3:
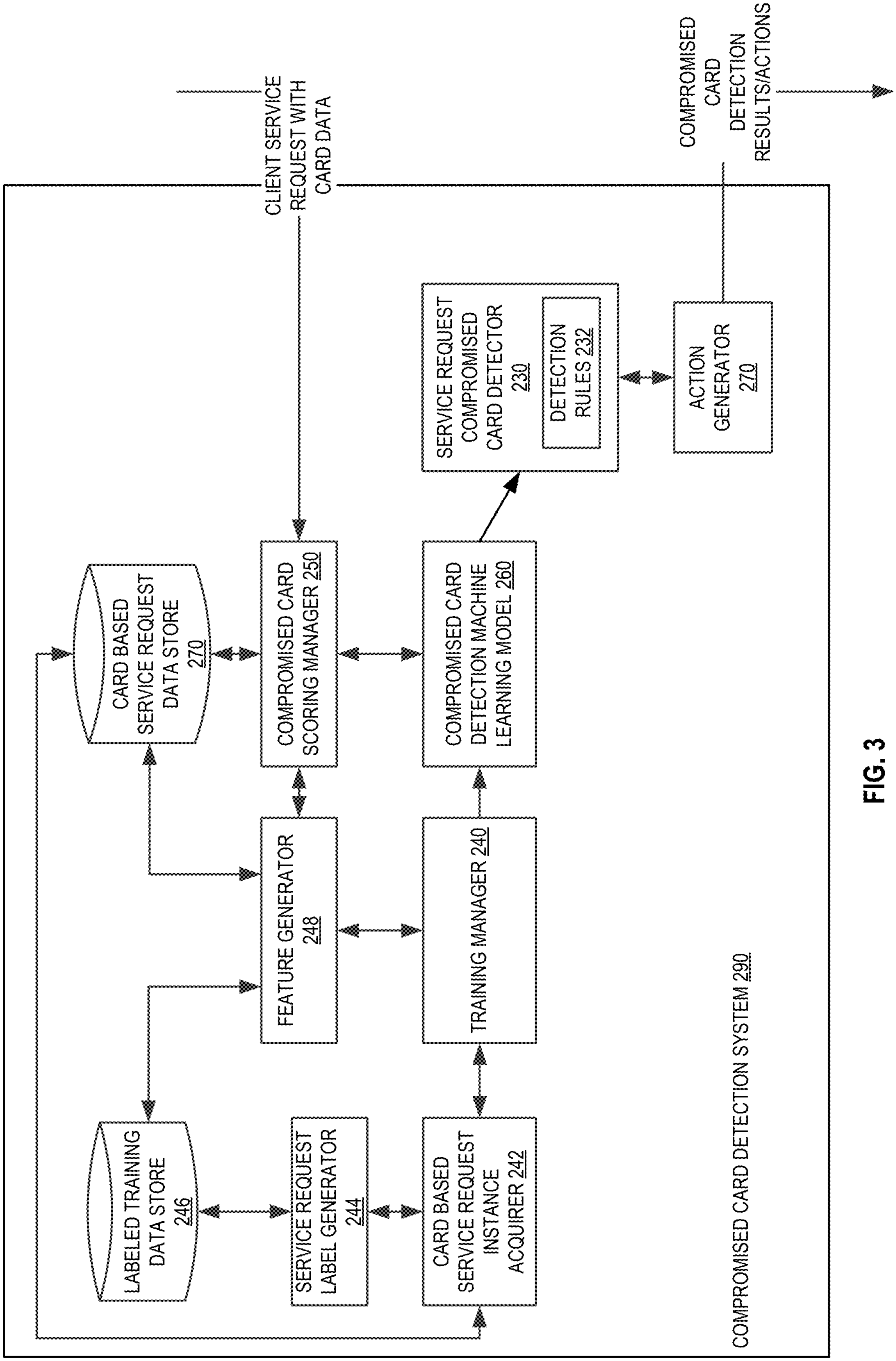
FIG. 3 is a block diagram of another embodiment of a compromised card detection system used by a server computer system.

FIG. 3 is a block diagram of another embodiment of a compromised card detection system 290 used by a server computer system. Compromised card detection system 290 provides a different embodiment and details for the compromised card detection system 112 discussed above in FIG. 1 and FIG. 2. In some embodiments, it may be desirable to compute an actual compromised card score for a new client service request with card data. While the ML model training of compromised card detection system 290 is performed in a substantially similar manner to that discussed above in FIG. 2, compromised card scoring manager 250 in FIG. 3 directly receives the new client service request with card data. Then, compromised card scoring manager 250 is responsible for triggering generation of compromised card features using feature generator 248. The feature generation process is the same as that discussed above in FIG. 2, and the details of that process are not repeated here.

Once the compromised card features are generated for the new client service request, the features and the service request data are provided to the machine learning model 260, which generates a compromised card score for the new client service request. In some embodiments, as illustrated in FIG. 3, machine learning model 260 provides the compromised card score generated for the service request to compromised card detector 230. The compromised card scoring generated by compromised card detector 230 represents the actual compromised card score for the new client service request, and thus represents a prediction of whether the card is compromised during the processing of the new service request. The compromised card score is then analyzed by compromised card detector 230 using the detection rules 232, and results provided to action generator 270, as discussed herein. In some embodiments, because the prediction is generated by machine learning model 260 for the new service request, an improved accuracy in the prediction may be obtained for the new service request over an inference generated for a prior service request, so that the application of the detection rules 232 by the compromised card detector 230 benefit from the improved accuracy in detecting when a card is compromised.

Figure 4B:
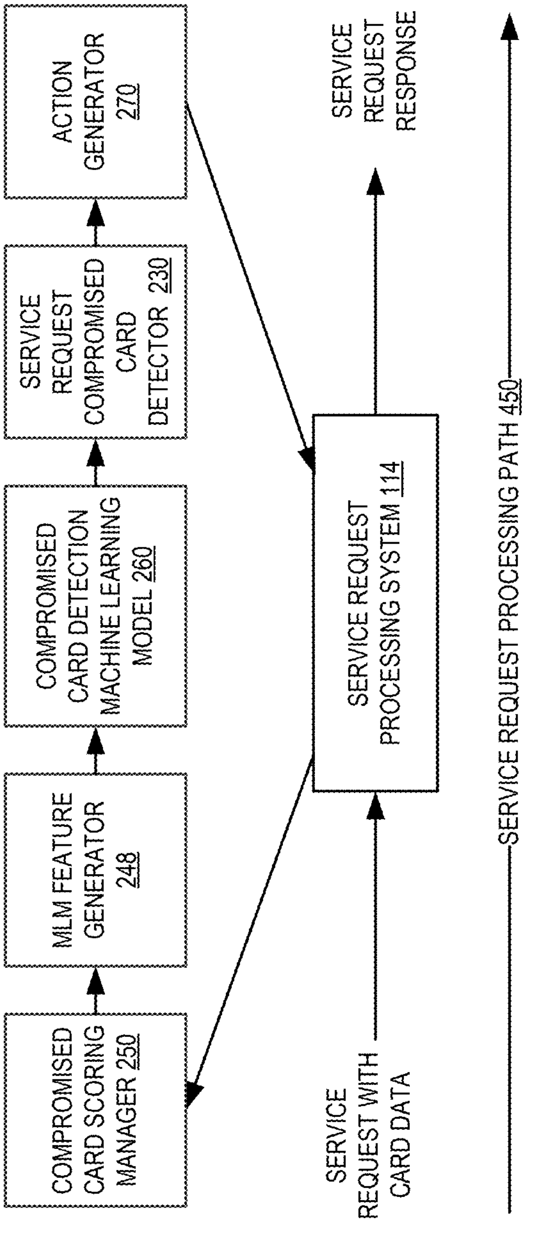
FIG. 4B is a block diagram of another embodiment of performing compromised card detection by a server computer system in a service request processing path.

FIG. 4B is a block diagram of another embodiment of performing compromised card detection using the embodiment of the compromised card detection system 290 in a service request processing path 450. In FIG. 4B, the service request system 114, in processing a received service request with card data within service request processing path 450, uses the compromised card detection system 290 to generate features for the received service request, generate scoring by inputting the features into an ML model, perform detection of a compromised card based on the ML model analysis, and then conditionally generates one or more remedial actions. In contrast to FIG. 4B, additional operations of the compromised card detection system 290 are performed in service request processing path.

In some embodiments, however, it may be desirable to generate a score for each new service request so that the scoring applied to the new service request is the actual scoring generated using ML input features computed for the new service request. Such an application scenario may be desirable when actual scoring performed and features generated for a service request are to be stored and analyzed at a later date. Furthermore, using the actual service request to generate compromised card features for that service request may yield improved accuracy of a compromised card for the service. Thus, FIGS. 3 and 4B trade additional latency and computational complexity added to a service request processing path for potentially more accurate compromised card detection.

Figure 5:
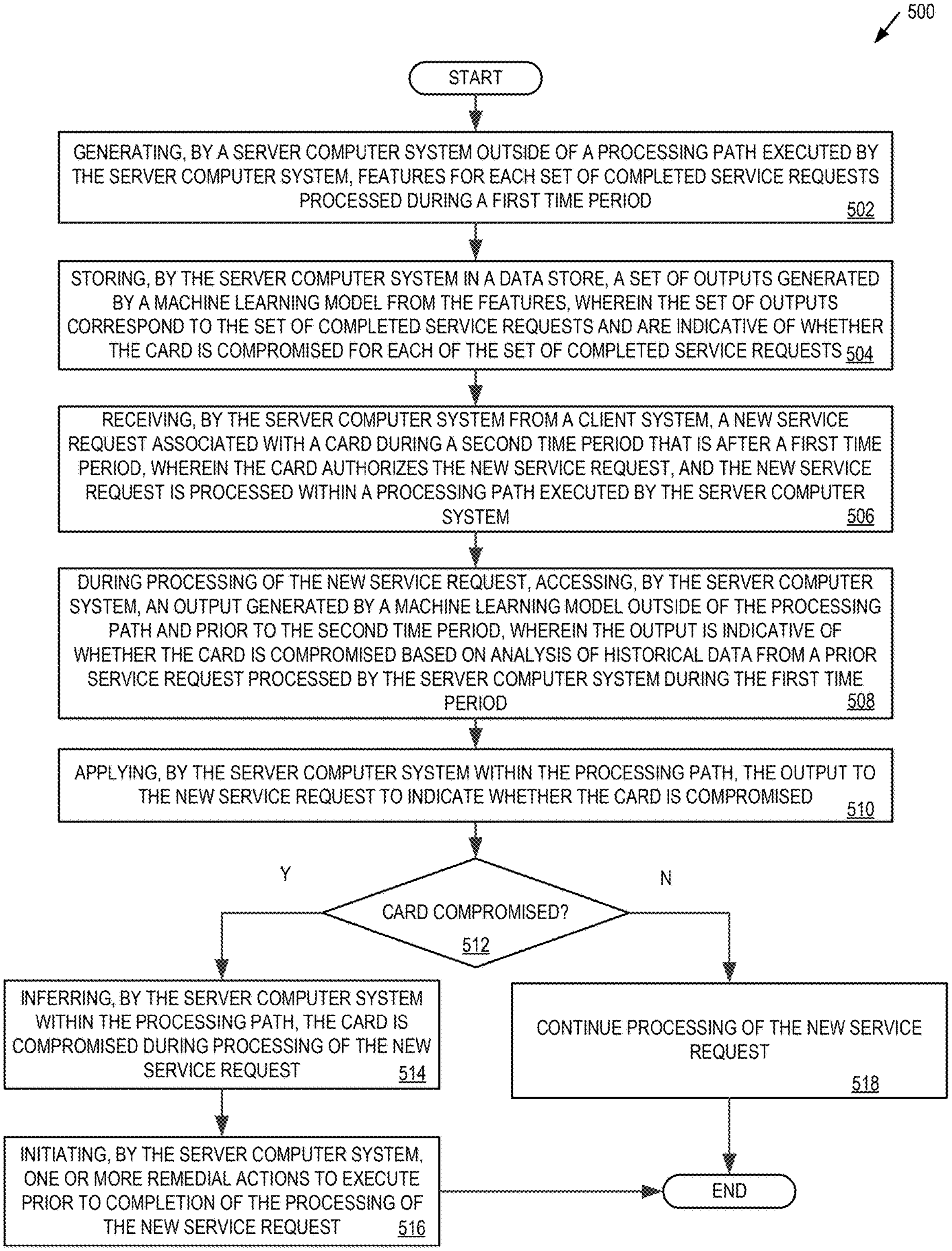
FIG. 5 is a flow diagram of one embodiment of a method for performing compromised card detection by a server computer system.

FIG. 5 is a flow diagram of one embodiment of a method for performing compromised card detection by a server computer system. The method 500 is performed by processing logic that may comprise hardware (circuitry, dedicated logic, etc.), software (such as is run on a general purpose computer system or a dedicated machine), firmware, or a combination. In one embodiment, the method 500 is performed by a compromised card detection system of a server computer system used to detect compromised cards used to authorize service requests (e.g., compromised card detection system 112 or 220).

Referring to FIG. 5, processing logic begins by generating, by a server computer system outside of a processing path executed by the server computer system, features for each set of completed service requests processed during a first time period (processing block 502). The features, as discussed herein, are features suitable for input to an ML model and are generated outside of a processing path for processing service requests. Furthermore, the features can include text based features (e.g., a card name, an email address, a user name, etc.), categorical features (e.g., an IP address, an agent identifier, a client system identifier, a card BIN number, etc.), and numerical features (e.g., counts over different periods of times of the occurrence of an event related to a card, user, client system, or card issuing system, such as counts of service attempts over different time periods, a number of time an email address was encountered over a time period, a number of times a card issuer reported decline codes to a server system, etc.). A number of these features are cumulative in that they represent observed behavior of a card, user, client system, card issue, or a combination thereof over different time periods, and which are relevant to determining whether each of the set of completed service requests processed during the first time period involved use of a compromised card.

Processing logic stores, by the server computer system in a data store, a set of outputs generated by a machine learning model from the features, wherein the set of outputs correspond to the set of completed service requests and are indicative of whether the card is compromised for each of the set of completed service requests (processing block 504). As discussed herein, the machine learning model is a model trained to detect usage of a compromised card from the input features computed above, and as discussed herein. Further, each of the set of outputs adapt over time so that the outputs corresponding to each of the set of completed service requests reflect a current state of a card as being either compromised or not compromised.

In some embodiments, processing blocks 502 and 504 are performed outside of a service request processing path. Thus, the processing operations, computational power, memory, and time expended for performing processing blocks 502 and 504 are not introduced into a service request processing path. This reduces latency introduced into the service request processing path improving the speed and timing of service request handling by a server computer system 110 and/or a service request processing system 114, while still enabling the utilizing of compromised card detection discussed herein.

Processing logic receives, by the server computer system from a client system, a new service request associated with a card during a second time period that is after a first time period, wherein the card authorizes the new service request, and the new service request is processed within a processing path executed by the server computer system (processing block 506). In some embodiments, the new service request is a request to perform a service and includes card data that seeks to authorize the service request. Furthermore, the receipt of the new service request is a request that is being processed within a service request processing path.

During processing of the new service request, processing logic accesses, by the server computer system, an output generated by a machine learning model outside of the processing path and prior to the second time period, wherein the output is indicative of whether the card is compromised based on analysis of historical data from a prior service request processed by the server computer system during the first time period (processing block 508). In some embodiments, the machine learning model output accessed is one of the outputs generated by processing blocks 502 and 504. Furthermore, the machine learning model output can be an output generated for a most recent service request received and processed during the second time period. In other words, the accessed machine learning model output is a most recent machine learning model output, or compromised card detection score.

Processing logic then applies, by the server computer system within the processing path, the output to the new service to indicate whether the card is compromised (processing block 510). As discussed herein, the application of the output generated for a prior service request to a new service request enables processing logic to efficiently and accurately attach a compromised card score to the new service. For example, a data access and data assignment are used by processing logic to apply the compromised card score to the new service request. This represents a savings in computational resources by avoiding having to perform a plurality of data accesses to access feature computation data, avoids using computational resources for performing feature computation, and further avoids performing a machine learning model analysis. Additionally, the savings also include reduced latency as a result of processing logic performing the more computationally efficient operations in applying the output to the new service request.

Processing logic determines whether the card used for authorization of the new service request is compromised (processing block 512). In embodiments, processing logic may compare the machine learning model output to a threshold value, which when satisfied indicates the card is a compromised card. In some embodiments, processing logic combines the machine learning model output with one or more other machine learning model scores, which are received with the new service request, to generate a multi-dimensional compromised card score. The multidimensional compromised card score is also compared to a threshold to detect whether the card used to authorize the new service request is compromised.

When the card is determined to be compromised based on the machine learning model output from the first time period, processing logic infers, by the server computer system within the processing path, the card is compromised during processing of the new service request (processing block 514). In some embodiments, this can include assigning a compromised card score generated by an ML model for a service request from the first time period to the new service request.

Processing logic then initiates, by the server computer system, one or more remedial actions to execute prior to completion of the processing of the new service request (processing block 516). In some embodiments, a number of remedial actions can be initiated, including block or rejecting a service request, generating a notification to a user, client system, and/or card issuer that the card is compromised, instructing a service request processing system (e.g., system 114) to limit a rate of service requests associated with the compromise card, user associated with the compromised card, client system associated with the compromised card, etc.

However, when processing logic determines the card is not compromised, processing logic continues processing of the new service request (processing block 518). Since the card is not compromised, the service request can continue and be executed by one or more distributed service system(s) 116.

In some embodiments, processing blocks 506 to 518 are performed within a service request processing path. However, the operations performed by processing logic in blocks 506-518 are computationally and memory efficient operations. Thus, they may be performed to detect compromised cards within the service request processing path, but while minimizing the introduction of latency to the service request processing path and reducing hardware resources consumed to detect compromised cards within the service request processing path. Additionally, the use of the inferred compromised card scoring and machine learning analysis from a prior service request applied to a new service request ensures sufficient accuracy of compromised card detection for the new service request. This is achieved by using various cumulative features computed over different time periods. By doing this, the features account for a history and pattern of potential compromised cards, and applying the inferred compromised card machine learning model output from prior period to a service request from a current period ensures that the inferred scoring applied to the service request is an accurate reflection of a likelihood that a card is compromised during the current service request.

Figure 6:
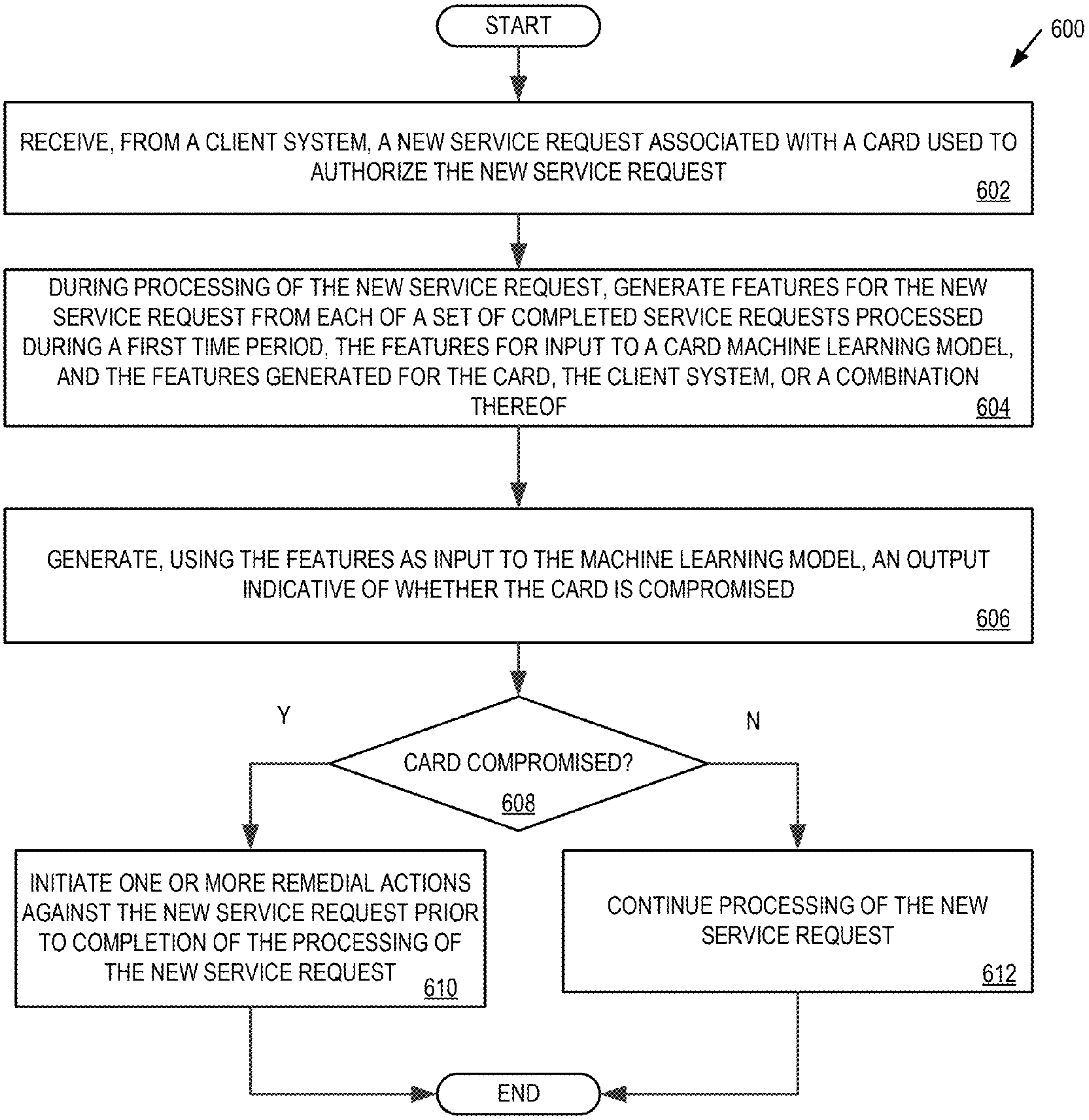
FIG. 6 is a flow diagram of another embodiment of a method for performing compromised card detection by a server computer system.

FIG. 6 is a flow diagram of another embodiment of a method for performing compromised card detection by a server computer system. The method 600 is performed by processing logic that may comprise hardware (circuitry, dedicated logic, etc.), software (such as is run on a general purpose computer system or a dedicated machine), firmware, or a combination. In one embodiment, the method 600 is performed by a compromised card detection system of a server computer system used to detect compromised cards used to authorize service requests (e.g., compromised card detection system 112 or 290).

Many of the operations of processing logic discussed below in FIG. 6 are performed in accordance with the discussion above. However, some embodiments of FIG. 6, the operations 602-612 are performed by processing logic within a service request processing path.

Referring to FIG. 6, processing logic begins by receiving, from a client system, a new service request associated with a card used to authorize the new service request (processing block 602).

During processing of the new service request, processing logic generate features for the new service request from each of a set of completed service requests processed during a first time period, the features for input to a machine learning model, and the features generated for the card, the client system, or a combination thereof (processing block 604). Processing logic then generates, using the features as input to the machine learning model, an output indicative of whether the card is compromised (processing block 606).

When the card is determined by processing logic to be compromised (processing block 608), processing logic initiates one or more remedial actions against the new service request prior to completion of the processing of the new service request (processing block 610). However, when the card is determined by processing logic not to be compromised (processing block 608), processing logic continues processing of the new service request (processing block 612).

In some embodiments, the processing logic of FIG. 6 is used by a compromised card detection system (e.g., system 112) within a service request processing path. While the embodiment of FIG. 6 may introduce additional latency into the processing path, the tradeoff may be for additional accuracy in each individual compromised card detection performed by processing logic.

Figure 7:
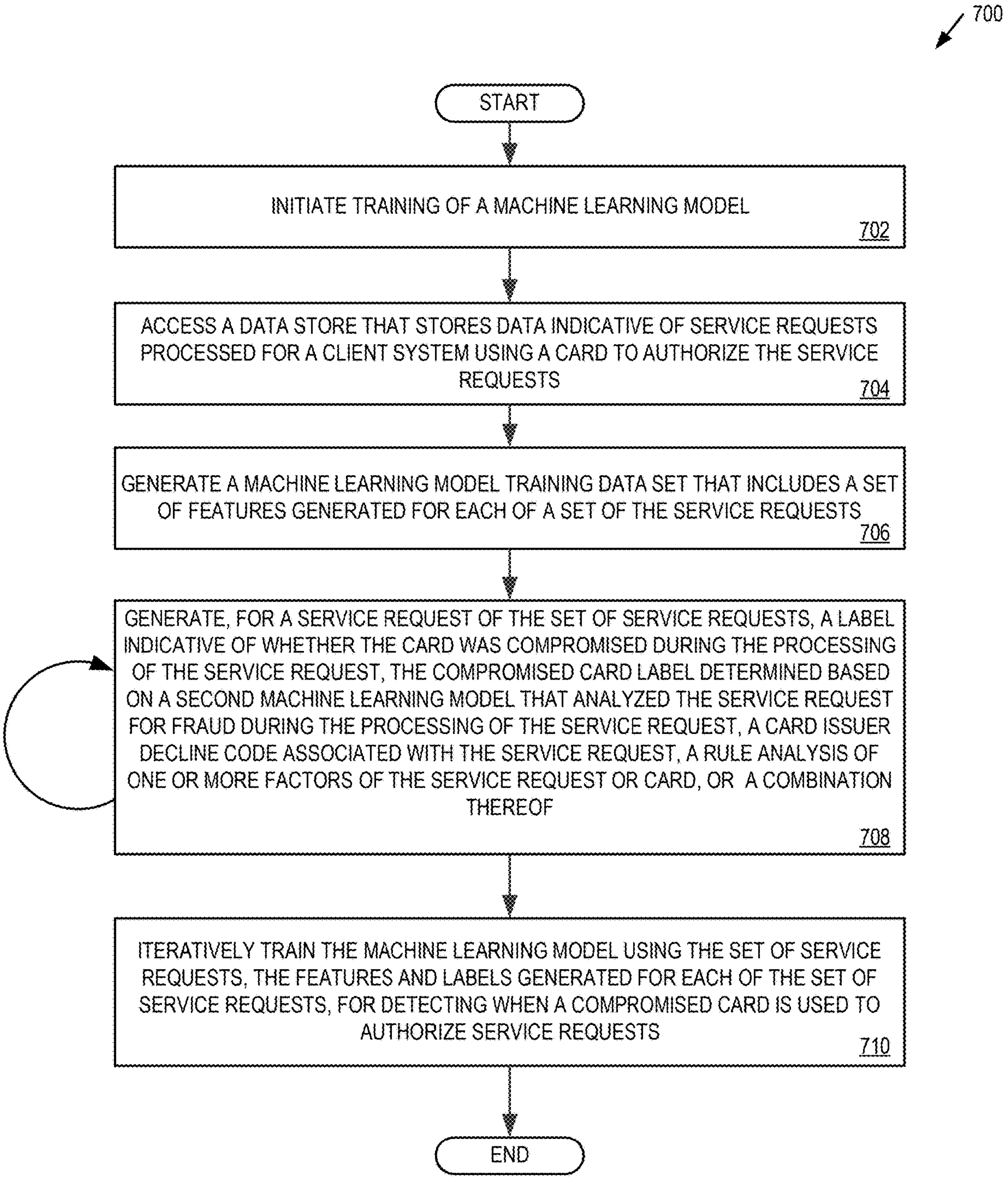
FIG. 7 is a flow diagram of one embodiment of a method for training a compromised card detection machine learning model by a server computer system.

FIG. 7 is a flow diagram of one embodiment of a method for training a compromised card detection machine learning model by a server computer system. The method 700 is performed by processing logic that may comprise hardware (circuitry, dedicated logic, etc.), software (such as is run on a general purpose computer system or a dedicated machine), firmware, or a combination. In one embodiment, the method 700 is performed by a compromised card detection system of a server computer system used to train a compromised card machine learning model (e.g., compromised card detection system 112, 220, or 290).

Referring to FIG. 7, processing logic begins by initiating training of a machine learning model (processing block 702). The machine learning model, as discussed herein, is trained to detect whether a card sought to be used to authorize a service request is compromised (e.g., card information for the card is controlled or used by a nefarious actor). In some embodiments, processing logic initiates training on a daily, weekly, bi-weekly, etc. basis. The periodic training of the machine learning model enables the model to adapt to new and emerging threats to cards, as well as to adapt to new attack patterns of compromised card usage.

Processing logic accesses a data store that stores data indicative of service requests processed for a client system using a card to authorize the service requests (processing block 704). The data store may be a data store maintained by a service request processing system, and accessible to processing logic. Furthermore, for each service request, the data store maintains a number of data records, including a card identifier, a PIN number, a user identifier, a client system identifier, an IP address of a user and/or client system, one or more keys encoded in the card, a type of service request, characteristics of the service request (e.g., timing, amount, etc.), one or more card issuer codes issued as a result of the service request being processed (e.g., decline codes, authorization codes, etc.), as well as any other information that may be generated by or for service requests.

Processing logic then generates a machine learning model training data set that includes a set of features generated for each of a set of the service requests (processing block 706). In some embodiments, the set of service requests can be for a window that is different from the periodic bases that training is performed at. For example, periodic machine learning model training may be initiated on a weekly basis, but processing logic can use a prior 5, 6, 12, or other number of months of prior service requests for feature generation. Furthermore, the features, as discussed herein, can include text-based features, categorical features, and numerical features. Additionally, processing logic may transform (e.g., by applying a GRU block or an embedding block) non-numerical features into numerical features.

Processing logic then generates, for a service request of the set of service requests, a label indicative of whether the card was compromised during the processing of the service request, the label determined based on a second machine learning model that analyzed the service request for fraud during the processing of the service request, a card issuer decline code associated with the service request, a rule analysis of one or more factors of the service request or card, or a combination thereof (processing block 708). Processing logic therefore utilizes one or more sources for determining what label to apply to a training data (e.g., an output that another machine learning model, such as a fraud model, card testing model, card cashing model, etc. generates form a service request's characteristics). The labeling sources, which include fraud detection mechanisms, may be leveraged to determine how they relate to whether or not a card is compromised using the periodic machine learning model training.

For example, a card testing model can predict whether a card is compromised because it is pretrained to detect card testing attack vectors/behaviors. When card testing is detected by such a model for a service request, a label can be joined to the service request and/or feature set generated for the service request. As another example, a card cashing model is a client system side model that predicts whether cards used by a client system fraudulently seek advances. When card cashing is detected by such a model for a service request, a label can also be joined the service request and/or feature set generated for the service request. In some embodiments, when a client system is labeled as card casher, processing logic can access all recent service requests originating from the client system and apply a compromised card label to those service requests. As yet another example, card issuer feedback, such as decline codes received from the issuer, are also indicative of a compromised card being used by a client system. Thus, processing logic can join a compromised card label to a service request for which a certain issuer code is received. As yet another example, known card information, such as the card appearing in a collection of card data on the dark web (e.g., a database, listing, etc. of card information collected to nefarious purposes), can be used to join a compromised card label to a service request and/or features for the service request.

Processing logic then iteratively trains the machine learning model using the set of service requests, the features, and the labels generated for each of the set of service requests, for detecting when a compromised card is used to authorize service requests (processing block 710).

Figure 8:
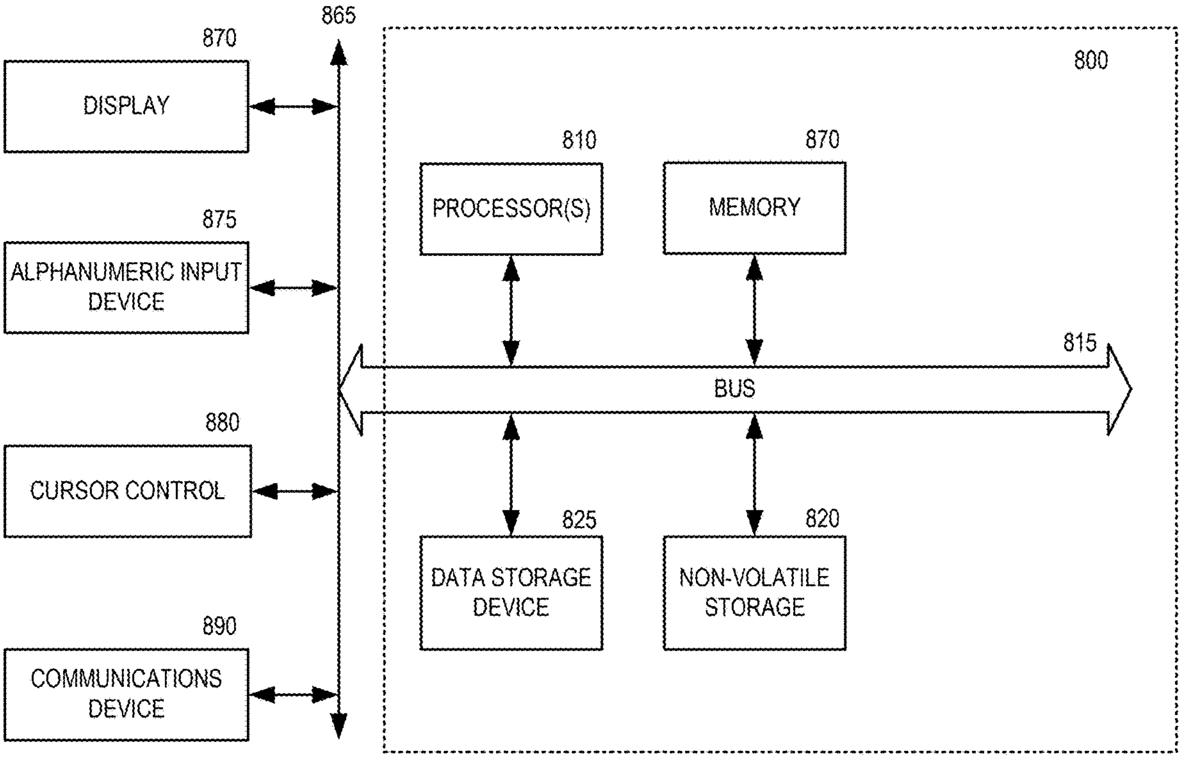
FIG. 8 is one embodiment of a computer system that may be used to support the systems and operations discussed herein.

FIG. 8 is one embodiment of a computer system that may be used to support the systems and operations discussed herein. For example, the computer system illustrated in FIG. 8 may be used by a server computer system, a client system, a third party system, etc. It will be apparent to those of ordinary skill in the art, however that other alternative systems of various system architectures may also be used.

The data processing system illustrated in FIG. 8 includes a bus or other internal communication means 815 for communicating information, and a processor 810 coupled to the bus 815 for processing information. The system further comprises a random access memory (RAM) or other volatile storage device 850 (referred to as memory), coupled to bus 815 for storing information and instructions to be executed by processor 810. Main memory 850 also may be used for storing temporary variables or other intermediate information during execution of instructions by processor 810. The system also comprises a read only memory (ROM) and/or static storage device 820 coupled to bus 815 for storing static information and instructions for processor 810, and a data storage device 825 such as a magnetic disk or optical disk and its corresponding disk drive. Data storage device 825 is coupled to bus 815 for storing information and instructions.

The system may further be coupled to a display device 870, such as a light emitting diode (LED) display or a liquid crystal display (LCD) coupled to bus 815 through bus 865 for displaying information to a computer user. An alphanumeric input device 865, including alphanumeric and other keys, may also be coupled to bus 815 through bus 865 for communicating information and command selections to processor 810. An additional user input device is cursor control device 880, such as a touchpad, mouse, a trackball, stylus, or cursor direction keys coupled to bus 815 through bus 865 for communicating direction information and command selections to processor 810, and for controlling cursor movement on display device 870.

Another device, which may optionally be coupled to computer system 800, is a communication device 890 for accessing other nodes of a distributed system via a network. The communication device 890 may include any of a number of commercially available networking peripheral devices such as those used for coupling to an Ethernet, token ring, Internet, or wide area network. The communication device 890 may further be a null-modem connection, or any other mechanism that provides connectivity between the computer system 800 and the outside world. Note that any or all of the components of this system illustrated in FIG. 8 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 850, mass storage device 825, or other storage medium locally or remotely accessible to processor 810.

It will be apparent to those of ordinary skill in the art that the system, method, and process described herein can be implemented as software stored in main memory 850 or read only memory 820 and executed by processor 810. This control logic or software may also be resident on an article of manufacture comprising a computer readable medium having computer readable program code embodied therein and being readable by the mass storage device 825 and for causing the processor 810 to operate in accordance with the methods and teachings herein.

The embodiments discussed herein may also be embodied in a handheld or portable device containing a subset of the computer hardware components described above. For example, the handheld device may be configured to contain only the bus 815, the processor 810, and memory 850 and/or 825. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 810, a data storage device 825, a bus 815, and memory 850, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

We claim:

1. A method for detecting compromised cards during service requests transmitted to a distributed services system, the method comprising:

receiving, by a server computer system from a client system, a new service request associated with a card during a second time period that is after a first time period, wherein the card authorizes the new service request, and the new service request is processed within a processing path executed by the server computer system;

during processing of the new service request, accessing, by the server computer system, an output generated by a machine learning model outside of the processing path and prior to the second time period, wherein the output is indicative of whether the card is compromised based on analysis of historical data from a prior service request processed by the server computer system during the first time period;

applying, by the server computer system within the processing path, the output to the new service request to indicate whether the card is compromised; and in response to inferring, by the server computer system within the processing path, that the card is compromised during processing of the new service request, initiating, by the server computer system, one or more remedial actions to execute prior to completion of the processing of the new service request.

2. The method of claim 1, wherein prior to receiving the new service request, the method further comprises:

generating, by the server computer system outside of the processing path, features for each set of completed service requests processed during the first time period; and storing, by the server computer system in a data store, a set of outputs generated by the machine learning model from the features, wherein the set of outputs correspond to the set of completed service requests and are indicative of whether the card is compromised for each of the set of completed service requests.

3. The method of claim 2, wherein one of the set of outputs applied by the server computer system within the processing path and stored in the data store is a recent output from a recently completed service request, and the method further comprises:

generating, by the server computer system within the processing path, the inference that the card is compromised during processing of the new service request based on the output generated by the machine learning model.

4. The method of claim 2, wherein the features comprise one or more text-based features, one or more categorical features, and one or more numerical features.

5. The method of claim 4, wherein one or more of the one or more numerical features correspond to a count generated from a plurality of past service requests over a third time period.

6. The method of claim 1, wherein the output is a numerical value generated by the machine learning model as a prediction of whether the card is compromised for the prior service request, and the card is inferred as compromised during the new service request when the numerical value satisfies a first threshold.

7. The method of claim 1, wherein the output generated by the machine learning model comprises a numerical value that represents a prediction of whether the card is determined to be compromised for the prior service request, and inferring, by the server computer system within the processing path, that the card is compromised further comprises:

combining the numerical value with a second numerical value generated for the new service request by a second machine learning model to generate a multidimensional score;

comparing the multidimensional score to a second threshold value; and determining that the card is compromised based on whether the multidimensional score satisfies the second threshold value.

8. The method of claim 1, further comprising:

initiating training of the machine learning model;

accessing a data store that stores data indicative of service requests processed for the client system using the card to authorize the service requests;

generating a training data set that includes a set of features generated for each of a set of the service requests, wherein the set of features comprise one or more text-based features, one or more categorical features, and one or more numerical features;

generating, for a service request of the set of service requests, a label indicative of whether the card was compromised during the processing of the service request; and iteratively training the machine learning model using the set of service requests, the set of features, and the label generated for each of the set of service requests, to detect when a compromised card is used to authorize future service requests.

9. The method of claim 8, wherein the label is generated for the service request based on at least one of (i) a third machine learning model that analyzes the service request during the processing of the service request, and (ii) a code received from an issuer of the card for the service request.

10. The method of claim 8, wherein the machine learning model is a neural network based machine learning model.

11. A non-transitory computer readable storage medium storing instructions, which when executed by a server computer system, causes the server computer system to perform operations for detecting compromised cards during service requests transmitted to a distributed services system, the operations comprising:

receiving, by a server computer system from a client system, a new service request associated with a card during a second time period that is after a first time period, wherein the card authorizes the new service request, and the new service request is processed within a processing path executed by the server computer system;

during processing of the new service request, accessing, by the server computer system, an output generated by a machine learning model outside of the processing path and prior to the second time period, wherein the output is indicative of whether the card is compromised based on analysis of historical data from a prior service request processed by the server computer system during the first time period;

applying, by the server computer system within the processing path, the output to the new service request to indicate whether the card is compromised; and in response to inferring, by the server computer system within the processing path, that the card is compromised during processing of the new service request, initiating, by the server computer system, one or more remedial actions to execute prior to completion of the processing of the new service request.

12. The non-transitory computer readable storage medium of claim 11, wherein prior to receiving the new service request, the operations further comprise:

generating, by the server computer system outside of the processing path, features for each set of completed service requests processed during the first time period; and storing, by the server computer system in a data store, a set of outputs generated by the machine learning model from the features, wherein the set of outputs correspond to the set of completed service requests and are indicative of whether the card is compromised for each of the set of completed service requests.

13. The non-transitory computer readable storage medium of claim 12, wherein one of the set of outputs applied by the server computer system within the processing path and stored in the data store is a recent output from a recently completed service request, and the operations further comprise:

generating, by the server computer system within the processing path, the inference that the card is compromised during processing of the new service request based on the output generated by the machine learning model.

14. The non-transitory computer readable storage medium of claim 11, wherein the output generated by the machine learning model comprises a numerical value that represents a prediction of whether the card is determined to be compromised for the prior service request, and the operations for inferring, by the server computer system within the processing path, that the card is compromised further comprise:

combining the numerical value with a second numerical value generated for the new service request by a second machine learning model to generate a multidimensional score;

comparing the multidimensional score to a second threshold value; and determining that the card is compromised based on whether the multidimensional score satisfies the second threshold value.

15. The non-transitory computer readable storage medium of claim 11, the operations further comprising:

initiating training of the machine learning model;

accessing a data store that stores data indicative of service requests processed for the client system using the card to authorize the service requests;

generating a training data set that includes a set of features generated for each of a set of the service requests, wherein the set of features comprise one or more text-based features, one or more categorical features, and one or more numerical features;

generating, for a service request of the set of service requests, a label indicative of whether the card was compromised during the processing of the service request; and iteratively training the machine learning model using the set of service requests, the set of features, and the label generated for each of the set of service requests, to detect when a compromised card is used to authorize future service requests.

16. A server computer system for detecting compromised cards during service requests transmitted to a distributed services system, the server computer system comprising:

a memory; and one or more processors coupled with the memory configured to perform operations, comprising:

receiving, by the server computer system from a client system, a new service request associated with a card during a second time period that is after a first time period, wherein the card authorizes the new service request, and the new service request is processed within a processing path executed by the server computer system;

during processing of the new service request, accessing, by the server computer system, an output generated by a machine learning model outside of the processing path and prior to the second time period, wherein the output is indicative of whether the card is compromised based on analysis of historical data from a prior service request processed by the server computer system during the first time period;

applying, by the server computer system within the processing path, the output to the new service request to indicate whether the card is compromised; and in response to inferring, by the server computer system within the processing path, that the card is compromised during processing of the new service request, initiating, by the server computer system, one or more remedial actions to execute prior to completion of the processing of the new service request.

17. The server computer system of claim 16, wherein prior to receiving the new service request, the one or more processors are further configured to perform operations comprising:

generating, by the server computer system outside of the processing path, features for each set of completed service requests processed during the first time period; and storing, by the server computer system in a data store, a set of outputs generated by the machine learning model from the features, wherein the set of outputs correspond to the set of completed service requests and are indicative of whether the card is compromised for each of the set of completed service requests.

18. The server computer system of claim 17, wherein one of the set of outputs applied by the server computer system within the processing path and stored in the data store is a recent output from a recently completed service request, and the one or more processors are further configured to perform operations comprising:

generating, by the server computer system within the processing path, the inference that the card is compromised during processing of the new service request based on the output generated by the machine learning model.

19. The server computer system of claim 16, wherein the output generated by the machine learning model comprises a numerical value that represents a prediction of whether the card is determined to be compromised for the prior service request, and the one or more processors are further configured to perform operations for inferring, by the server computer system within the processing path, that the card is compromised, the operations comprising:

combining the numerical value with a second numerical value generated for the new service request by a second machine learning model to generate a multidimensional score;

comparing the multidimensional score to a second threshold value; and determining that the card is compromised based on whether the multidimensional score satisfies the second threshold value.

20. The server computer system of claim 16, wherein the one or more processors are further configured to perform operations comprising:

initiating training of the machine learning model;

accessing a data store that stores data indicative of service requests processed for the client system using the card to authorize the service requests;

generating a training data set that includes a set of features generated for each of a set of the service requests, wherein the set of features comprise one or more text-based features, one or more categorical features, and one or more numerical features;

generating, for a service request of the set of service requests, a label indicative of whether the card was compromised during the processing of the service request; and iteratively training the machine learning model using the set of service requests, the set of features, and the label generated for each of the set of service requests, to detect when a compromised card is used to authorize future service requests.

* * * * *